INVENTORS
JACQUES CHOLET
JEAN CLAUDE DUBOIS

BY  *Craig & Antonelli*

ATTORNEYS

United States Patent Office 3,524,519
Patented Aug. 18, 1970

3,524,519
DEVICE FOR DETONATING EXPLOSIVE CHARGES IN A LIQUID MEDIUM
Jacques Cholet, Rueil-Malmaison, and Jean Claude Dubois, Royan, France, assignors to Institut Francais du Petrole des Carburants et Lubrifiants, Rueil-Malmaison, France
Filed Dec. 18, 1967, Ser. No. 691,289
Claims priority, application France, Dec. 22, 1966, 88,875; Oct. 13, 1967, 124,503
Int. Cl. G01v *1/06, 1/12, 1/38*
U.S. Cl. 181—.5        15 Claims

ABSTRACT OF THE DISCLOSURE

In a device for detonating an explosive charge in a liquid medium, there is provided a hollow cartridge body having one flared end which serves as a means for seating the body in an immersed end of a carging tube. An explosive charge is provided in a portion of the cartridge body and is disposed at the end thereof away from the flared end. A first conductive material is provided on the inner wall of the cartridge body between the end of the charge closest to the flared end and the flared end to electrically connect the charge to a terminal disposed within the immersed charging tube. A second conductive material is provided on the outer wall of the cartridge body, at least on a portion thereof nearer the end of the charge most remote from the flared end of the cartridge body, so that the second conductive material together with the water in which the device is immersed electrically connects the charge to a second terminal which is electrically insulated from the first terminal. Means, for example a wire, are provided in the charge to electrically connect one end thereof to the other.

Figure 1:
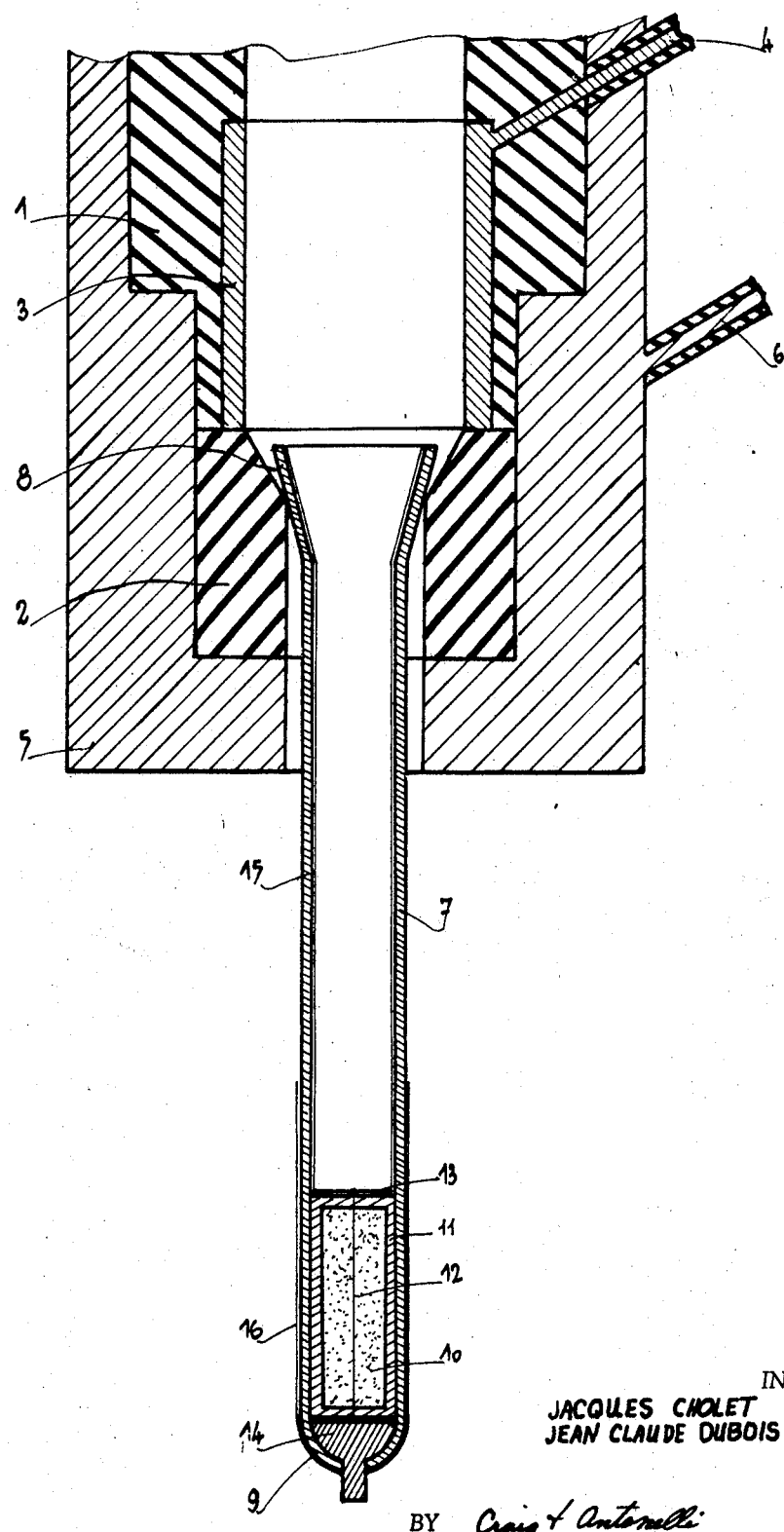

In another embodiment, the first conductive material on the inner wall of the cartridge body may be replaced by a tube having an externally coated thin layer of conductive material thereon, the tube having a diameter slightly smaller than the inner diameter of the cartridge and resting on a conductive plate disposed on the top of the charge closest to the flared end of the cartridge.

The present invention relates to a device for detonating explosive charges in a liquid medium which is preferably electrically conductive, the firing of these charges being effected by sparking.

Among the devices used heretofore for underwater seismic prospecting, it is possible to mention, in particular, the sparking devices which generate a spark between at least two electrodes located close to each other and supplied with a high energy or also the devices causing the detonation of explosive charges by means of a detonator in contact with these charges.

The present invention has for an object a device for underwater firing an explosive charge by closing an electric circuit, this charge being housed in a hollow cartridge including a cartridge body terminated at one end by a nose and extended at the other end by a cartridge head which has a cross section greater than that of the cartridge body and constitutes means for holding said cartridge against a cartridge seat located at an immersed end of a loading pipe, the explosive charge filling only a part of the internal hollow space of said cartridge, the remainder of said space being filled with water, said explosive charge being located within said cartridge closer to the nose thereof than to the cartridge head.

This device is characterized in that the internal part of the cartridge body comprised between said cartridge head and said explosive charge includes a conductive element which is mainly metallic and electrically connected with at least a conductor internal to said loading tube on one side, said conductor being connected with a first terminal of a source of electric current, and with that end of the explosive charge located closer to said cartridge head on the other side, said device being further characterized in that the other end of said charge located closer to said cartridge nose is connected, through at least a conductive element which is mainly metallic and located essentially outside said cartridge, with an electrically conductive element insulated from the inner part of said loading pipe, said conductive element being connected with the second terminal of said source of electric current.

Each cartridge contains an explosive charge which may include a liquid solid or pulverulent explosive element, or also many constituents the combination of which constitutes an explosive mixture.

These constituents may be each housed in a casing made of a perforable and/or destructible material.

In such a case the device will moreover include means for perforating and/or destroying each casing, allowing to perform the mixing of the respective constituents contained in these casings.

The firing is achieved by means of a spark produced through the so-constituted explosive charge.

It should be appreciated that the device according to the invention does not require any detonator, which is an appreciable advantage with regard to the safety of operation.

Figure 2:
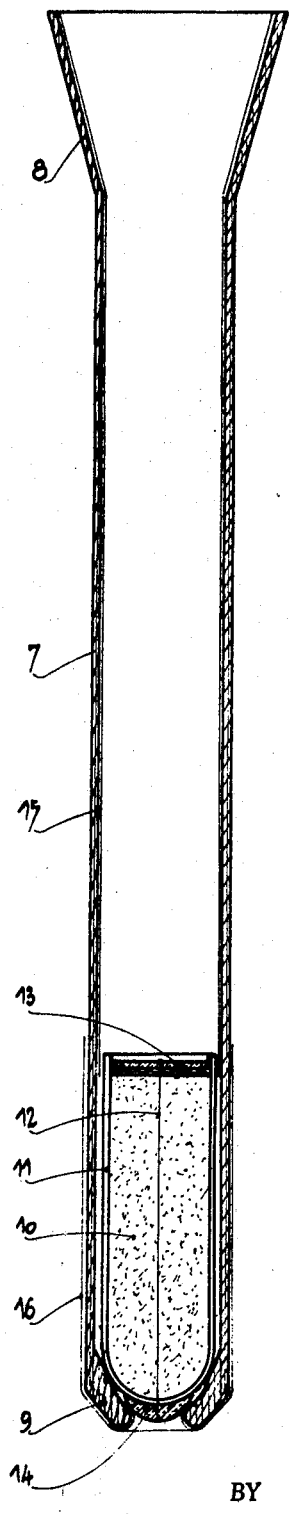
Figure 3:
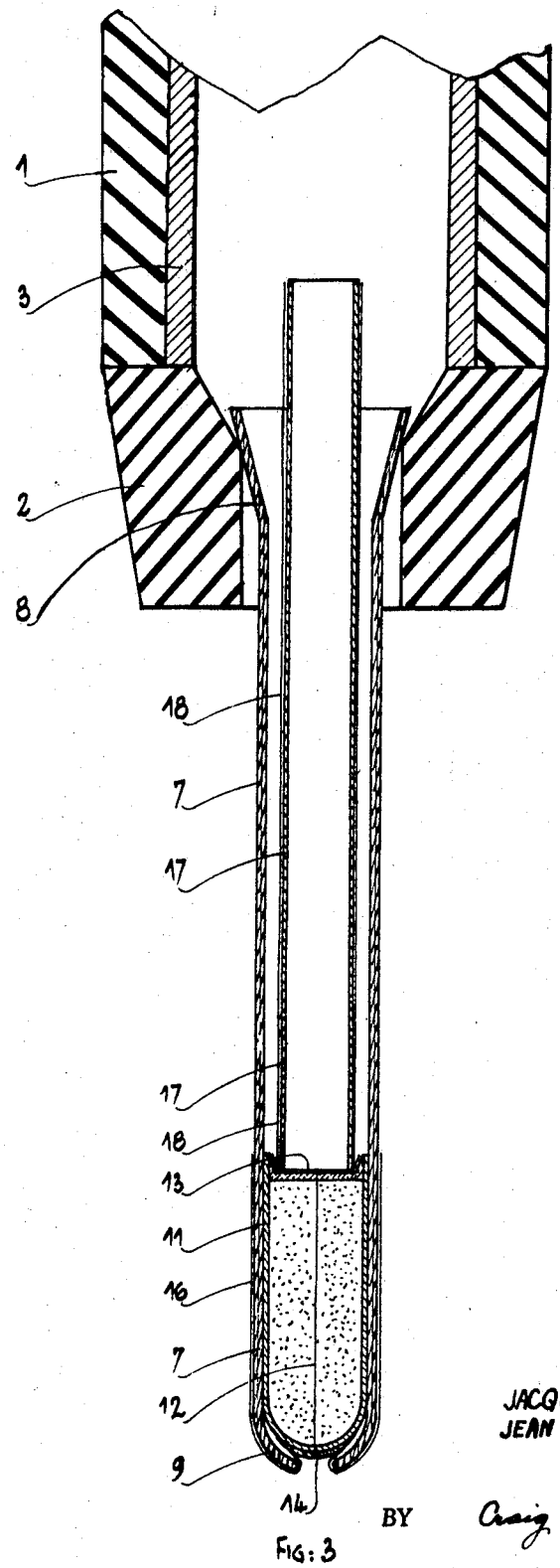
Figure 4:
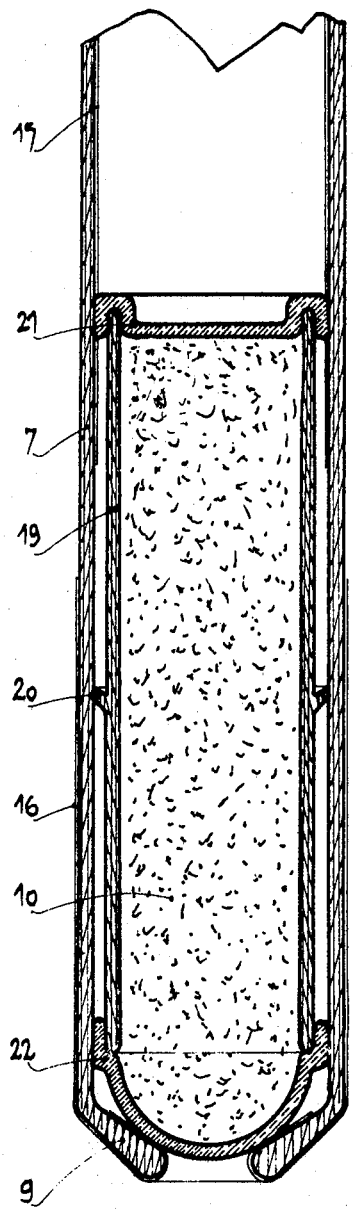
Figure 5:
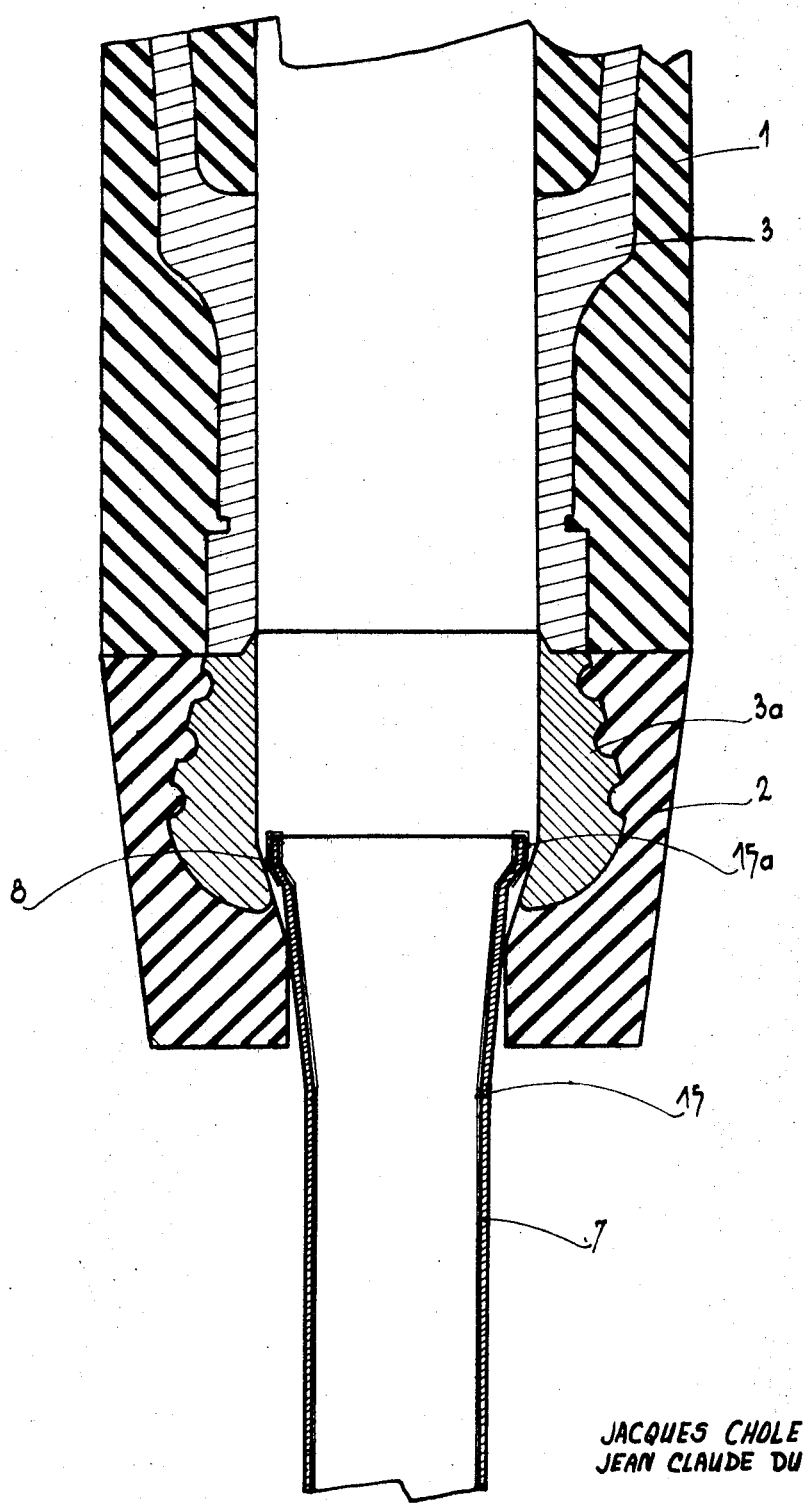
Figure 6:
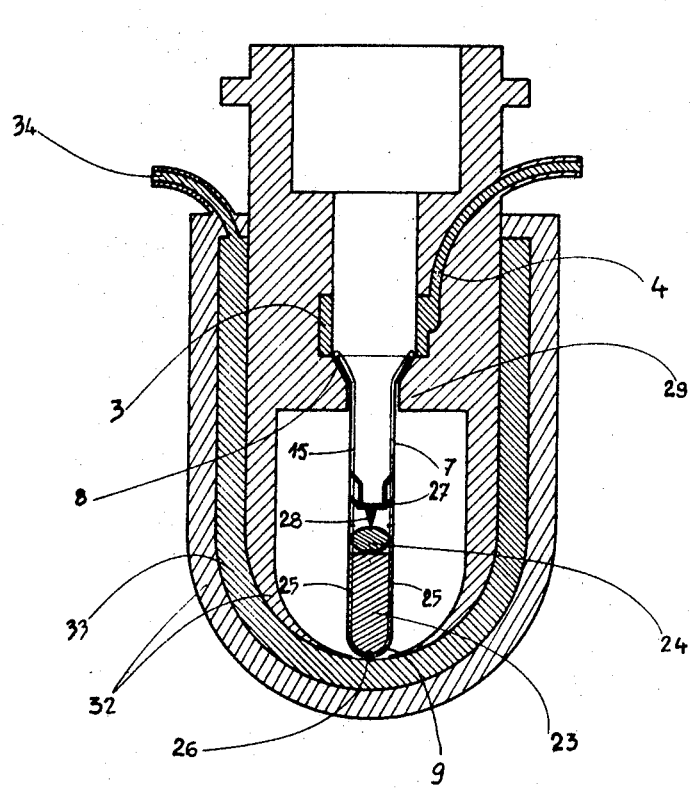
Figure 7:
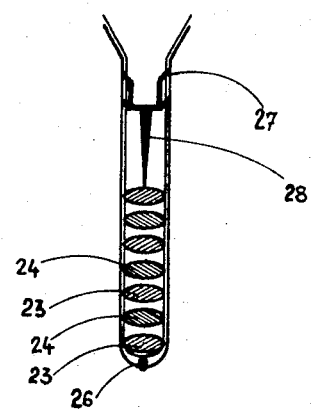

The invention will be described more in detail with reference to the attached drawings wherein:

FIG. 1 shows a sectional view of a first embodiment of the firing device,

FIG. 2 shows a sectional view of a first embodiment of a cartridge adapted to the device of FIG. 1, FIG. 3 shows a sectional view of a second embodiment of a cartridge according to the invention, FIG. 4 shows a sectional view of a third embodiment of a cartridge, FIG. 5 shows a sectional view of a second embodiment of the firing device according to the invention, FIG. 6 illustrates a sectional view of a third embodiment of the firing device according to the invention, FIG. 7 shows a sectional view of a modification of the embodiment shown by FIG. 6, Referring to FIG. 1, the device shown by way of example includes a loading pipe 1 of insulating material, extended at one end by a cartridge seat 2.

The internal wall of the pipe 1 is provided at one end thereof with a ring 3 made of a conductive material connected, through an electrically insulated conductive cable 4, with a first terminal of a source of electric current (not shown). This ring constitutes of first electrode. The end of the pipe 1 and the cartridge seat 2 are externally surrounded by a sleeve 5 made of a conductive material connected by a conductive cable 6, which may or not be electrically insulated, with the second terminal of the source of electric current.

When it is desired to perform an explosion, an explosive cartridge is sent through the loading pipe by a known method until this cartridge comes into abutment against the cartridge seat 2.

In embodiment of a cartridge according to the invention which is illustrated in detail by FIG. 2, this cartridge is constituted by a cylindrical body 7 made of an insulating material, extended at one end by an enlarged head 8 and the other end of which constitutes the cartridge nose 9.

An explosive charge 10 is enclosed in a substantially cylindrical casing 11 of insulating material. This charge is traversed longitudinally by a conductive wire 12 of very small diameter which can explode when traversed by a very strong electric current.

Each end of the wire 12 is connected with a conducting plate (plates 13 and 14 respectively) which is located outside each end wall of the casing 11. The whole explosive charge must be introduced into the cartridge body 7 up to the abutment constituted by the cartridge nose 9.

The head and the body 7 of the cartridge are internally coated with a thin layer destructible by explosion of a conducting material 15, substantially up to the level of the plate 13 located at the upper part of the explosive charge. The cylindrical body 7 of the cartridge is also at its lower part externally coated with a thin layer 16 of a conducting material, for example over a length of this body corresponding to the length of the explosive charge, or over a greater length.

When the explosive charge is in abutment against the cartridge nose, the conducting plate 14 will advantageously be in contact with the conductive coating 16.

In position for firing, the cartridge head 8 housing the explosive charge is located in abutment against the seat 2, providing for a tight separation between the body of conducting liquid inside the pipe 1 and the body of conducting liquid outside this pipe.

Moreover, the casing 11 surrounding the explosive charge must be at its lower part permanently in contact with the insulating inner wall of the cartrige nose, so as to provide for tightness between the external body and the internal body of conducting liquid.

Firing is achieved by applying a very high potential difference between the conducting wires 4 and 6 which respectively supply the electrodes 3 and 5.

The electric current flows through a circuit which is closed by the conducting wire 12, thereby causing the detonation of the latter. Starting from the electrode 3 (FIG. 1), this circuit includes the conducting body of water located between this electrode and the conductive coating 15 inside the cylindrical body 7, said conductive coating itself, the conducting plate 13, the wire 12, the conducting plate 14, the external conductive coating 16 and the body of liquid located outside the device, between the coating 16 and the electrode 5.

Such a device which permits to avoid the use of a detonator and allows to use a stable explosive material, can be handled with great safety.

FIG. 3 shows a second embodiment of a cartridge which can be used in the device according to the invention. This cartridge is not provided with the internal conductive coating 15. This coating is substituted for by a tube 17 which is externally coated with a thin layer of conductive material 18. This tube, the diameter of which is slightly smaller than the inner diameter of the cartridge, rests upon the conducting plate 13.

At the instant of firing, the electric current flows from the electrode 3 to the conductive coating 18 through the annular space located between this electrode and this coating and filled with conducting liquid, then to the conducting plate 13 and the wire 12. The conducting liquid may be water and may have a maximum value corresponding to a resistance of 10Ω.

FIG. 4 illustrates a third embodiment of a cartridge according to the invention.

The cartridge body and the cartridge head are provided with an internal conductive coating 15 and with an external conductive coating 16, as in the embodiment of FIG. 2. The explosive charge 10 is of a known type and includes components which make this charge conductive. This charge is enclosed in a cylindrical casing 19 made of an insulating material, provided with a sealing ring 20 also made of an insulating material, the external diameter of which is adapted to the internal diameter of the cartridge body 7. The casing 19 is closed at the ends thereof by means of covers made of a conducting material, 21 and 22 respectively, which may for example be crimped at said ends, these covers being in contact with the conducting explosive charge.

In this embodiment, the electric current flows through the circuit constituted by the body of water inside the pipe 1, the conducivte coating 15, the cover 21, the charge 10, the cover 22, the conductive coating 16 and the body of water located outside the device, between said conductive coating 16 and the electrode 5.

According to another embodiment of the device, illustrated by FIG. 5, the cartridge seat 2 is internally provided with a ring 3a made of a conducting material, extending the ring 3 which is located at the end of the pipe 1 and serving as an electrode.

The conductive coating 15 of the cartridge is extended toward the cartridge head and is folded back at 15a against the external wall of said head, so that said folding 15a is in contact with the electrode 3a when the cartridge is in abutment against its seat.

In this embodiment, when the firing occurs, the electric current flows directly from the electrode 3a to the coating 15a–15 without the intermediary of any conducting body of water.

In a third embodiment of the device according to the invention, shown by FIG. 6, the electric connection between the external electrode and the conducting elements is achieved by direct contact through a contact stud.

In this embodiment, moreover, an explosive charge including two components has been selected.

With reference to FIG. 6, two charges of components of the explosive 23 and 24 are placed in the cartridge body 7 destructible by explosion. The cartridge includes internally, at its upper part, electrically conductive elements, preferably destructible by the explosion.

According to a preferred embodiment of the invention, a part of the body 7 and the head 8 are internally lined with a thin conductive coating 15 destructible by explosion, for example made of copper. The lower part of the cartridge includes at least a conducting element which, in the considered embodiment, is constituted by two conducting wires 25 each having one end connected with the coating 15, the other ends being interconnected and also connected with a contact stud 26 traversing the cartridge nose 9. The charge 23 is in this embodiment constituted by a component of an explosive, consisting of a pulverulent material stable by itself, such as for example ammonium nitrate and/or aluminum powder.

This charge is located inside the cartridge nose 9.

The charge 24 is a second component of an explosive, a liquid component, stable by itself, for example, dinitrobenzene or dinitrotoluene contained in a casing made of a material which is destructible by explosion (plastic material or glass, for example). This second charge within its casing is placed into the cartridge body 7, in the immediate vicinity of the first charge.

A sliding element 27 which may be provided with joints having the shape of annular lips is displaceable with the cartridge body 7 while providing for tightness between the lower part of the cartridge, housing the components of the explosive charge, and the remaining upper part. The sliding element 27 is provided with a perforating member 28, such as for example a needle whose end is directed toward the explosive charges.

The so-arranged cartridge is sent through a loading pipe (not shown), for example by means of a stream of water under pressure flowing through this pipe, down to the cartridge seat 29. The cartridge seat 29 made of a resisting material which is insulating or provided with an insulating coating, includes internally a ring 3 of a conducting material connected through a conductor 4 having an insulating coating with a source of high voltage current, for example 4,000 volts, located at the water surface (not shown on the drawing).

The cartridge seat 29 is also connected with an element 32 having substantially the shape of a yoke, made of an insulating material or of a material provided with an inulating coating.

A conducting element 33 is housed in the insulating material of said yoke and connected with the source of current through a conductor 34, that portion of the element 33 located at the lower part of the yoke, on the internal side thereof, being however not insulated.

When the cartridge, which is for example carried by a stream of water under pressure reaches its position for explosion, its enlarged head 8 rests upon the internal wall of the cartridge seat 29 and the contact stud 26, at its end, comes into contact with the uncoated portion of the conducting element 33.

As soon as the cartridge head rests upon its seat, the pressure of the water stream is fully exerted on the sealing element 27, pushing the latter toward the cartridge nose. As a result of this movement, the needle 28 perforates or destroys the casing of the liquid charge 24. This charge runs over and impregnates the pulverulent charge 23 which becomes explosive.

The electric current supplied by the current generator at the surface is delivered on the one side to the conducting ring 3 through the conductor 4, on the other side to the conducting element 33 through the conductor 34. The electric circuit is closed between the ring 3 and the conducting element 33 through the body of water located inside the cartridge seat, through the internal conductive coating 15 of the cartridge, through the conducting wires 25 and the contact stud 26.

A spark of very high voltage (for example 4,000 volts) is generated and causes the wires 25 to blow out, thereby causing the explosion of the mixture formed by the charges 23 and 24.

In the case of a solid explosive, there would of course be no need to use the sliding element 27.

The special arrangement of the cartridge, as hereinabove described, offers the advantage of a high safety, as the stable components of the explosive may be carried without any danger of explosion and the cartridges prepared only shortly before the moment selected for the explosion.

According to a modification of the preceding embodiment of the invention, illustrated by FIG. 7, the charges 23 and 24 which constitute the explosive are both liquid. Several of these charges may be placed side by side, for example by alternating the two sorts of charges within the cartridge, the needle 28 being chosen of sufficient length to perforate all the casings of the charges at the instant before the explosion. The operation of the device in this embodiment is the same as in the preceding embodiment.

We claim:
1. A device for firing an explosive charge in a liquid medium by closing an electric circuit, wherein the explosive charge is contained in a hollow insulating material cartridge body terminating at one end thereof in a nose and at the other end thereof in a head, wherein the head of said cartridge body has a transverse cross section greater than that of the remainder of said body and serves as a means for seating said body in an immersed end of a charging tube, wherein said explosive charge occupies only a portion of the space inside said cartridge body with the remaining space being substantially filled with said liquid medium, and wherein said charge is disposed in said cartridge closer to the nose than to the head thereof, which comprises:
 (1) a first substantially metallic conductor element disposed on the inner wall of said cartridge body between said head thereof and said explosive charge to electrically connect the end of said charge closest to said head to at least one conductor within said charging tube, said conductor being connectable to a first terminal of a current source;
 (2) a second substantially metallic conductor element disposed on the outer wall of said cartridge body and extending substantially from said nose thereof to a predetermined distance toward said head thereof;
 (3) means for electrically connecting the end of said charge closest to said nose of said cartridge with said second conductor element;
 (4) means for connecting said second conductor element to a second terminal of said current source, said means being insulated from said conductor within said charging tube; and
 (5) means for electrically connecting said end of said charge closest to said head of said cartridge body to said end closest to said nose thereof.

2. The device of claim 1, wherein said second substantially metallic conductor element comprises a metallic sheath disposed on a portion of said outer wall of said cartridge body.

3. The device of claim 1, wherein said first substantially metallic conductor element comprises a metallic sheath disposd on a portion of said inner wall of said cartridge body.

4. The device according to claim 1, wherein said first substantially metallic conductor element comprises a destructible conductor tube.

5. The device of claim 1, wherein said explosive charge is comprised of a plurality of separate elements, at least one of said plurality being contained in a destructible envelope and being separated thereby from the other of said elements, and further including means movably mounted within said cartridge body for perforating said destructible envelope and for effecting a fluid-tight seal between said charge and a mass of water disposed within said body.

6. The device of claim 1, wherein said means for connecting said second conductor element to a second terminal includes a third conductor on said charging tube, said third conductor being insulated from said conductor within said tube.

7. The device of claim 6, wherein the means for electrically connecting the head end and nose end of the charge comprises a metallic connection, and wherein at least a portion of the conductive paths connecting the head end of said charge to said conductor within said charging tube and connecting the nose end of said charge to said third conductor on said tube comprise metallic connections with the remainder of said conductive paths consisting essentially of water having a maximum resistance of 10Ω.

8. The device of claim 1, wherein said charge is disposed within said cartridge body in an envelope of insulating material, said envelope being separated from said body and having disposed on the portions thereof closest to the head and nose of said body respectively, a conductor element in electrical contact with said first substantially metallic conductor element on said inner wall of said cartridge body and a conductor element in electrical contact with said second substantially metallic conductor on said outer wall of said body.

9. The device of claim 8, wherein seal means are provided on said envelope of insulating material for effecting a fluid-tight seal between a mass of water within said cartridge body above said seal means and a mass of water outside of said body.

10. The device of claim 1, wherein said explosive charge is comprised of at least two components which are stable when separate and which are explosive when mixed, at least one of said components being enclosed in a destructible envelope, and which further includes means for destroying said envelope and sealing said charge from the remainder of said cartridge body.

11. The device of claim 10, wherein one of said two components is a pulverant material while the other of said components is a liquid.

12. The device of claim 10, wherein each of said two components are liquids.

13. A device for firing an explosive charge in a liquid medium by closing an electric circuit, wherein the explosive charge is contained in a hollow insulating material cartridge body terminating at one end thereof in a nose and at the other end thereof in a head, wherein the head of said cartridge body has a transverse cross section greater than that of the remainder of said body and serves as a means for seating said body in an immersed end of a charging tube, wherein said explosive charge occupies only a portion of the space inside said cartridge body with the remaining space being substantially filled with said liquid medium, and wherein said charge is disposed in said cartridge closer to the nose than to the head thereof, which comprises:

(1) a first substantially metallic conductor element disposed inside said cartridge body between said head thereof and said explosive charge to electrically connect the end of said charge closest to said head to at least one conductor within said charging tube, said conductor being connectable to a first terminal of a current source;

(2) a second substantially metallic conductor element disposed outside said cartridge body and electrically connected to the end of said charge closest to said nose;

(3) means for connecting said second conductor element to a second terminal of said current source, said means being insulated from said conductor within said charging tube; and (4) means for electrically connecting said end of said charge closest to said head of said cartridge body to said end closest to said nose thereof.

14. The device according to claim 13, wherein said first substantially metallic conductor element comprises a destructible conductor tube.

15. A device for firing an explosive charge in a liquid medium by closing an electric circuit, wherein the explosive charge is contained in an envelope of insulating material within a hollow insulating material cartridge body terminating at one end thereof in a nose and at the other end thereof in a head, wherein the head of said cartridge body has a transverse cross section greater than that of the remainder of said body and serves as a means for seating said body in an immersed end of a charging tube, wherein said explosive charge in said envelope occupies only a portion of the space inside said cartridge body with the remaining space being substantially filled with said liquid medium, and wherein said charge in said envelope is disposed in said cartridge closer to the nose than to the head thereof, said envelope being separated from said body, which comprises:

(1) a first substantially metallic conductor element disposed inside said cartridge body between said head thereof and said explosive charge to electrically connect the end of said charge closest to said head to at least one conductor within said charging tube, said conductor being connectable to a first terminal of a current source;

(2) a second metallic conductor element disposed outside said cartridge body and electrically connected to the end of said charge closest to said nose;

(3) means for connecting said second conductor element to a second terminal of said current source, said means being insulated from said conductor within said charging tube;

(4) a conductor element disposed on the portion thereof closest to the head of said body and in electrically contact with said first substantially metallic conductor element inside said cartridge body;

(5) a conductor element disposed on the portion thereof closest to the nose of said body and in electrically contact with said second substantially metallic conductor outside said body;

(6) means for electrically connecting said two conductor elements of said envelope.

References Cited

UNITED STATES PATENTS

| 2,681,701 | 6/1954 | Schlumberger | 102—70.2 X |
|---|---|---|---|
| 2,929,325 | 3/1960 | Lewis | 86—1 X |
| 2,967,481 | 1/1961 | Semon et al. | 102—16 |
| 3,360,070 | 12/1967 | Cholet et al. | |
| 3,368,641 | 2/1968 | Cholet et al. | |

RODNEY D. BENNETT, Primary Examiner

D. C. KAUFMAN, Assistant Examiner

U.S. Cl. X.R.

102—70.2